United States Patent
Lee et al.

(10) Patent No.: US 9,128,524 B2
(45) Date of Patent: Sep. 8, 2015

(54) METHOD FOR DELIVERING USER INPUT, AND DEVICE USING SAME

(75) Inventors: Byung Joo Lee, Seoul (KR); Wongyu Song, Seoul (KR); Inhwan Choi, Seoul (KR); Jaehyung Song, Seoul (KR)

(73) Assignee: LG ELECTRONICS INC., Seoul (KR)

(*) Notice: Subject to any disclaimer, the term of this patent is extended or adjusted under 35 U.S.C. 154(b) by 87 days.

(21) Appl. No.: 13/989,343

(22) PCT Filed: Dec. 20, 2011

(86) PCT No.: PCT/KR2011/009834
§ 371 (c)(1),
(2), (4) Date: May 23, 2013

(87) PCT Pub. No.: WO2012/099338
PCT Pub. Date: Jul. 26, 2012

(65) Prior Publication Data
US 2013/0246665 A1    Sep. 19, 2013

Related U.S. Application Data

(60) Provisional application No. 61/433,942, filed on Jan. 18, 2011, provisional application No. 61/446,499, filed on Feb. 25, 2011, provisional application No. 61/538,143, filed on Sep. 23, 2011.

(51) Int. Cl.
G06F 3/00 (2006.01)
G06F 3/01 (2006.01)
G06F 3/038 (2013.01)
H04L 29/08 (2006.01)
H04N 21/41 (2011.01)
H04N 21/422 (2011.01)
G06F 13/00 (2006.01)

(52) U.S. Cl.
CPC ............... G06F 3/016 (2013.01); G06F 3/038 (2013.01); H04L 67/2823 (2013.01); H04N 21/4126 (2013.01); H04N 21/42204 (2013.01)

(58) Field of Classification Search
CPC ........ G06F 3/00; G06F 13/00; G06F 2003/00
USPC ............................................. 710/11, 33, 313
See application file for complete search history.

(56) References Cited

U.S. PATENT DOCUMENTS

| | | | | |
|---|---|---|---|---|
| 8,296,469 | B2* | 10/2012 | Dunstan et al. | 710/8 |
| 8,427,525 | B2* | 4/2013 | Funabiki et al. | 348/43 |
| 2005/0027479 | A1* | 2/2005 | Lee | 702/182 |
| 2006/0179164 | A1 | 8/2006 | Katibian | |

(Continued)

OTHER PUBLICATIONS

Hid Usage Tables Version 1.12, Oct. 28, 2004, pp. 11-107.
USB Device Class Definition for HID Version 1.11, Jun. 27, 2001, pp. 1-58.
Human Interface Device (HID) Profile Version 1.0 Adopted Bluetooth Hid profile, May 22, 2003, pp. 20-23.

(Continued)

*Primary Examiner* — Christopher Shin
(74) *Attorney, Agent, or Firm* — McKenna Long & Aldridge LLP

(57) ABSTRACT

Provided is a method of delivering a user input received from a Human Interface Device (HID) to a source device by a sink device. The method includes: receiving the user input from the HID; generating HID user input information including a first field that represents a type of the HID, a second field that represents an interface type of the HID, and a third field that includes the user input received from the HID; and transmitting the configured HID user input information to the source device.

14 Claims, 13 Drawing Sheets

(56) References Cited

U.S. PATENT DOCUMENTS

2010/0082784 A1* 4/2010 Rosenblatt et al. ........... 709/222
2012/0069894 A1* 3/2012 Sakimura et al. ........ 375/240.02
2013/0173765 A1* 7/2013 Korbecki ..................... 709/221

OTHER PUBLICATIONS

Universal Serial Bus Specification revision 2.0, Apr. 27, 2000, pp. 239-274.

* cited by examiner

FIG.5

| Field | Size | Value |
|---|---|---|
| Subelement ID | 1 octet | TBD |
| Length | TBD | Variable |
| HID ID | 1 octet | Variable |
| HID interface type | 1 octet | Variable |
| HID device type | 1 octet | Variable |
| HID value | Variable | Variable |

FIG.6

| Value | HID Interface Type |
|---|---|
| 0 | Infrared |
| 1 | USB |
| 2 | Bluetooth |
| 3 | Zigbee |
| 4 | Wi-Fi |
| 5 | CEC |
| 6-254 | Reserved |
| 255 | Vendor Specific |

FIG.7

| Value | HID Device Type |
|---|---|
| 0 | Keyboard |
| 1 | Mouse |
| 2 | Touchpad |
| 3 | Joystick |
| 4 | Motion Sensor |
| 5-254 | Reserved |
| 255 | Vendor Specific |

FIG.8

| Value | Description |
|---|---|
| Variable | Frame format which is defined in other specification such as Bluetooth, Zigbee, USB or vendor specific. |

FIG.9

| Field | Size | Value |
|---|---|---|
| HID interface type | 1 octet | Variable |
| HID device type | 1 octet | Variable |
| HID value | Variable | Variable |

FIG.10

| Usage | HID Interface Type |
|---|---|

FIG.11

| Value (bit) | Control/Data indicator |
|---|---|
| bx00 | Data |
| bx01 | Control |
| bx10 | reserved |
| bx11 | |

ID
METHOD FOR DELIVERING USER INPUT, AND DEVICE USING SAME

CROSS-REFERENCE TO RELATED APPLICATIONS

This application is a 35 USC §371 National Stage entry of International Application No. PCT/KR2011/009834 filed Dec. 20, 2011, and claims priority of U.S Provisional Application Nos. 61/433,942 (filed on Jan. 18, 2011), 61/446,499 (filed on Feb. 25, 2011) and 61/538,143 (filed on Sep. 23, 2011), which are hereby incorporated by reference in its entirety.

BACKGROUND

The present disclosure relates to a network wirelessly connecting a plurality of devices, and more particularly, to a method of delivering a user input received from a human interface to a sink device into a source device.

A variety of wireless communication technologies have been developed along with the development of information communication technology. Among the wireless communication technologies, WLAN is a technology that allows portable terminals such as a personal digital assistant (PDA), a laptop computer, and a portable multimedia player (PMP) to wirelessly access a high-speed internet in a home or a business or specific service area, on the basis of wireless frequency technology.

For example, communication on the WLAN based on the IEEE 802.11 standard may be provided in a basic service set (BSS) including an access point (AP) and a distribution system. Moreover, recently, as a wireless short-range communication technology is widely applied to a market, a P2P wireless communication method for direct connection between devices without an AP is being developed.

SUMMARY

Embodiments provide a method and device for efficiently delivering a user input received from a human interface device.

In one embodiment, provided is a method of delivering a user input received from a Human Interface Device (HID) to a source device by a sink device. The method includes: receiving the user input from the HID; generating HID user input information including a first field that represents a type of the HID, a second field that represents an interface type of the HID, and a third field that includes the user input received from the HID; and transmitting the configured HID user input information to the source device.

In another embodiment, provided is a sink device delivering a user input received from a Human Interface Device (HID) to a source device. The sink device includes: a user interface unit receiving the user input from the HID; a control unit generating HID user input information including a first field that represents a type of the HID, a second field that represents an interface type of the HID, and a third field that includes the user input received from the HID; and a wireless transmitting/receiving unit transmitting the generated HID user input information to the source device.

Moreover, A non-transitory computer readable recording medium having a program recorded thereon, which, when executed by a computer, implements the user input delivery method.

According to an embodiment of the present invention, while a sink device delivers a user input, which is received from an HID, to a source device, the user input is packetized using a format received from the HID without additional conversion, and then, is transmitted to the source device. Therefore, response delay for the user input may be reduced, and also, a load of the sink device may be reduced.

According to another embodiment of the present invention, since the user input is delivered to the source device in addition to information on the HID, the user input may be efficiently processed.

The details of one or more embodiments are set forth in the accompanying drawings and the description below. Other features will be apparent from the description and drawings, and from the claims.

BRIEF DESCRIPTION OF THE DRAWINGS

FIGS. 5 to 8 are views illustrating a configuration of HID user input information according to a first embodiment of the present invention.

FIGS. 9 to 11 are views illustrating a configuration of HID user input information according to a second embodiment of the present invention.

DETAILED DESCRIPTION OF THE EMBODIMENTS

Hereinafter, a user input delivering method and a device using the same will be described in more detail with reference to FIGS. 1 to 20.

Hereinafter, detailed descriptions related to well-known functions or configurations will be ruled out in order not to unnecessarily obscure subject matters of the present invention. Moreover, terms described below are defined in consideration of the functions of the present invention and vary according to users, operators' intentions, or customs. Therefore, the definition may be determined based on the entire contents of this specification.

Figure 1:
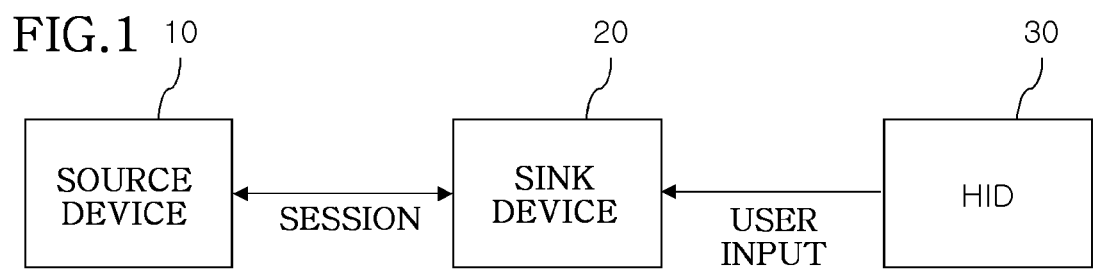
FIG. 1 is a block diagram illustrating a configuration of a display system according to an embodiment of the present invention.

FIG. 1 is a block diagram illustrating a configuration of a display system according to an embodiment of the present invention. The display system may include a source device 10, a sink device 20, and a human interface device (HID) 30.

Referring to FIG. 1, the source device 10 and the sink device 20 configure a display group to transmit and receive multimedia content such as video and audio and control signals through interconnected sessions.

That is, the source device 10 transmits multimedia content to the sink device 20 through the interconnected session, and for this, may have a wireless LAN interface for streaming the multimedia content to the sink device 20.

In addition, the sink device 20 may receive and play the multimedia content transmitted from the source device 10 through the interconnected session.

Here, each of the source device 10 and the sink device may be one of various devices such as TVs, home theater systems, mobile phones, and tablet PCs. Also, each of them 10 and 20 may be divided into a source and a sink according to hardware or software functions, or may support both source and sink roles.

For example, a wireless connection between the source device 10 and the sink device 20 may use a 5 GHz frequency band according to the IEEE 802.11ac, i.e., a Wi-Fi standard, and in this case, the source device 10 may stream an uncompressed High Definition (HD) video at a speed of up to 1 Gbps.

However, the present invention is not limited to the above wireless communication type, and may be implemented using various communication types, for example, a 60 GHz frequency band according to the IEEE 802.11ad standard.

The source device 10 and the sink device 20 belonging to one display group may be connected using a P2P connection type or a Tunneled Direct Link Setup (TDLS) connection type.

For example, the source device 10 and the sink device 20 may configure a network, i.e., a P2P group, without an access point (AP), on the basis of the 802.11 WLAN techniques, and then communicate data via a direct link. In this case, any one of the source device 10 and the sink device 20, as a group owner (GO), may perform a similar operation to the AP so as to manage the P2P group.

At the same time, each of the source device 10 and the sink device 20 may be connected to and communicated with an infrastructure BSS including an AP and a distribution system.

Moreover, the source device 10 and the sink device 20 may selectively connect to a session by using the TDLS. In this case, the source device 10 and the sink device 20 may connect to one AP and communicate with each other.

The HID 30, as a device for interface with a user, may convert a user input according to a specific format and then transmit the converted user input to the sink device 20.

For example, the HID 30 may be an input device such as a remote controller or one of various user input devices such as a touch panel, a touch keyboard, motion recognition, QWERTY remote control, a mouse, a trackball, and a joystick.

According to the universal series bus (USB) standard, devices may be classified in to a class such as a display device, a communication device, an audio device, a high capacity storage device, or the HID 30 according to the nature of data.

Additionally, the HID 30 may be a convergence device that is used as a display device or communication device such as a smart phone or a tablet PC, and the HID 30 simultaneously.

Moreover, an interface and frame that the HID 30 uses may be defined according to various standards.

For example, an infrared interface for TV remote control, a Bluetooth interface for a wireless keyboard or mouse, a USB interface for a wired interface device or wireless device, a Wi-Fi interface for IP based control through smart phone application or infrastructure, and a ZigBee interface for home appliance or factory automation may be used as an interface type of the HID 30.

In a display system using a wireless network as shown in FIG. 1, the sink device 20 delivers a user input received from the HID 30 to the source device 10, and then, the source device 10 executes an operation (for example, UI display) according to the user input.

For this, a session control such as play, pause, or auto routing may be defined between the source device 10 and the sink device 20, and this may be transmitted by a session control action frame.

Moreover, the sink device 20 may deliver a command in an action frame format to the source device 10 by using a profile of an HDMI CEC command.

Figure 2:
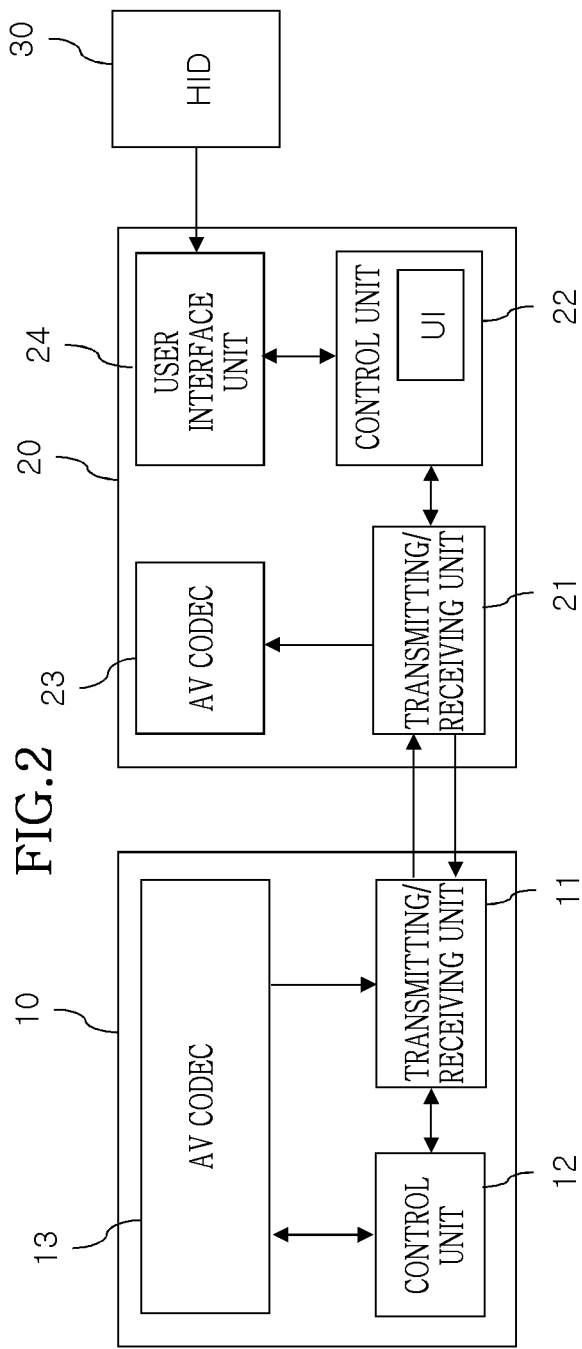
FIG. 2 is a block diagram illustrating configurations of devices according to an embodiment of the present invention.

FIG. 2 is a block diagram illustrating configurations of devices according to a first embodiment of the present invention. That is, FIG. 2 illustrates each configuration of the source device 10 and the sink device 20 shown in FIG. 1.

Referring to FIG. 2, the source device 10 may include a transmitting/receiving unit 11, a control unit 12, and an AV codec 13. The sink device 20 may include a transmitting/receiving unit 21, a control unit 22, an AV codec 23, and a user interface unit 24.

Moreover, the transmitting/receiving units 11 and 21 may transmit/receive frames in a format set according to a communication standard to perform a session connection between the source device 10 and the sink device 20, including transport and network layers.

The transmitting/receiving unit 11 in the source device 10 may transmit multimedia content to the sink device 20 via a connected session through the above processes, and the transmitting/receiving unit 22 in the sink device 20 may receive the multimedia transmitted from the source device 10.

Also, the control units 12 and 22 may perform processes such as device search, service search, and device pairing on the basis of information in the frames transmitted/received through the transmitting/receiving units 11 and 21, and thus, may connect and manage a session between the source device 10 and sink device 20.

For this, the control units 12 and 22 may include a MAC layer and a PHY layer and the MAC/PHY layers may support a communication standard such as 802.11, Wi-Fi Direct, or TDLS.

Or, the sink device 20 may configure a UI autonomously or according to UI information received from the source device 10 in the case of a remote UI, and then may display it on a screen.

For example, the control unit 22 of the sink device 20 may configure a UI by using operating system (OS) and software (SW), and then may display it through a display module (not shown) provided in or connected to the sink device 20.

The AV codecs 13 and 23 may encode or decode the multimedia content transmitted/received through a session between the source device 10 and the sink device 20.

For example, the AV codec 13 in the source device 10 encodes video and audio signals to be transmitted to the sink device 20, and the AV codec 23 in the sink device 20 decodes the video and audio signals transmitted from the source device 10.

Moreover, the HID 30 may deliver a user input the sink device 20 through an interface such as Infrared, Bluetooth, USB, Wi-Fi, or ZigBee. For example, the sink device 20 may receive a user input from the HID 30 through the user interface unit 24.

In this case, the HID 30 connected to the sink device 20 may not communicate with the source device 10, and the sink device 20 may configure or change a UI through the control unit 22 according to a user input received from the HID 30.

The sink device 20 may deliver information on a user input inputted directly or received from the HID 30 to the source device 10 through use of an action frame.

Figure 3:
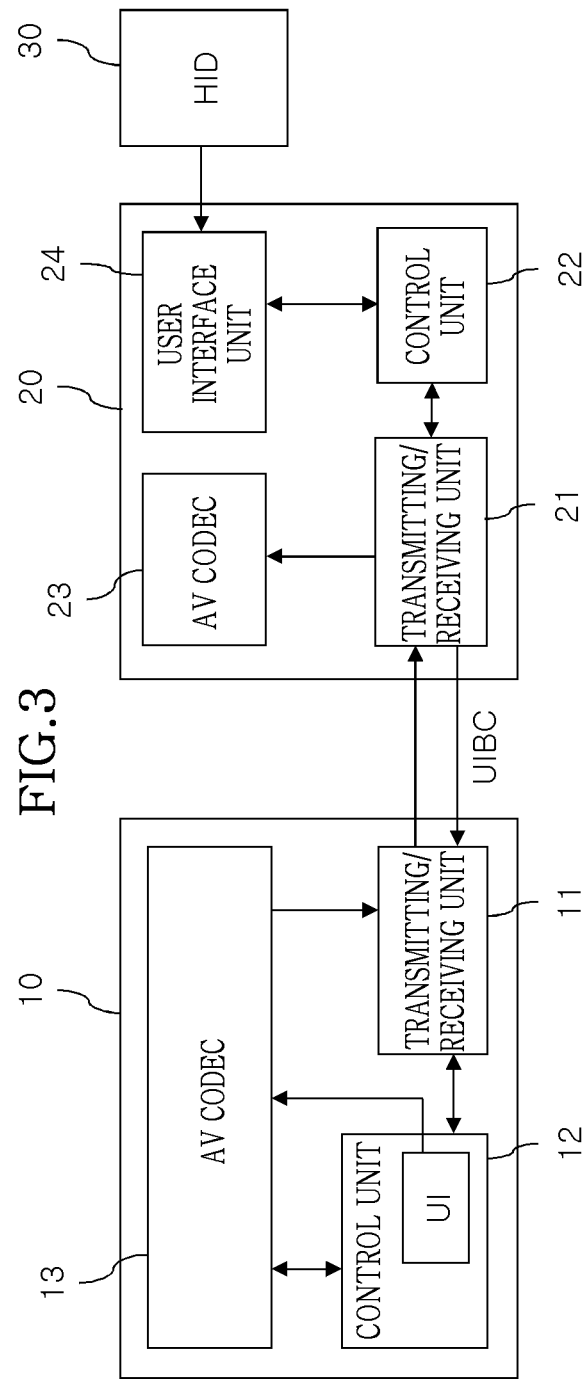
FIG. 3 is a block diagram illustrating configurations of devices according to another embodiment of the present invention.

Referring to FIG. 3, the source device 10 may configure a UI and display it on a screen, and may transmit the displayed UI to the sink device 20 in addition to multimedia content through a session connected to the sink device 20.

For example, a UI screen configured with OS/SW of the control unit 22 may be multiplexed with multimedia content to be transmitted to the sink device 20, and then may be delivered to the sink device 20 through one Transport Stream (TS).

Additionally, the configured UI screen and the multimedia content are delivered to the sink device 20 via additional TS, and the sink device 20 may overlay the UI screen delivered via the additional TS with the multimedia content and then, may display it on a screen.

As show in FIG. 3, the sink device 20 converts a user input received from the HID 30 and delivers it to the source device 10 through a user input back channel (UIBC).

For this, the sink device 20 may include a converter for generating an action frame by parsing a user input received from the HID 30. It is necessary to define a structure and interface for parsing an action frame received from the sink device 20 at the source device 10 and delivering it to OS/SW.

In this case, through processes such as the parsing and conversion of the sink device 20 and the parsing and UI encoding of the source device 10 for the user input, response delay to the user input occurs. Therefore, long latency may be required until a user confirms the application of a corresponding input.

According to an embodiment of the present invention, the sink device 20 may packetize a user input received from the HID 30 according to the received format as it is without additional conversion, and then, may transmit it to the source device 10. Therefore, a response delay to the user input and the load of the source device 10 and the sink device 20 may be reduced.

The configurations of the source device 10 and the sink device 20 described with reference to FIGS. 2 and 3 are just one example, and thus, the present invention is not limited thereto. Therefore, the source device 10 or the sink device 20 may omit some of the components shown in FIG. 2 or 3 or may further include additional components according to a function of a corresponding device.

Figure 4:
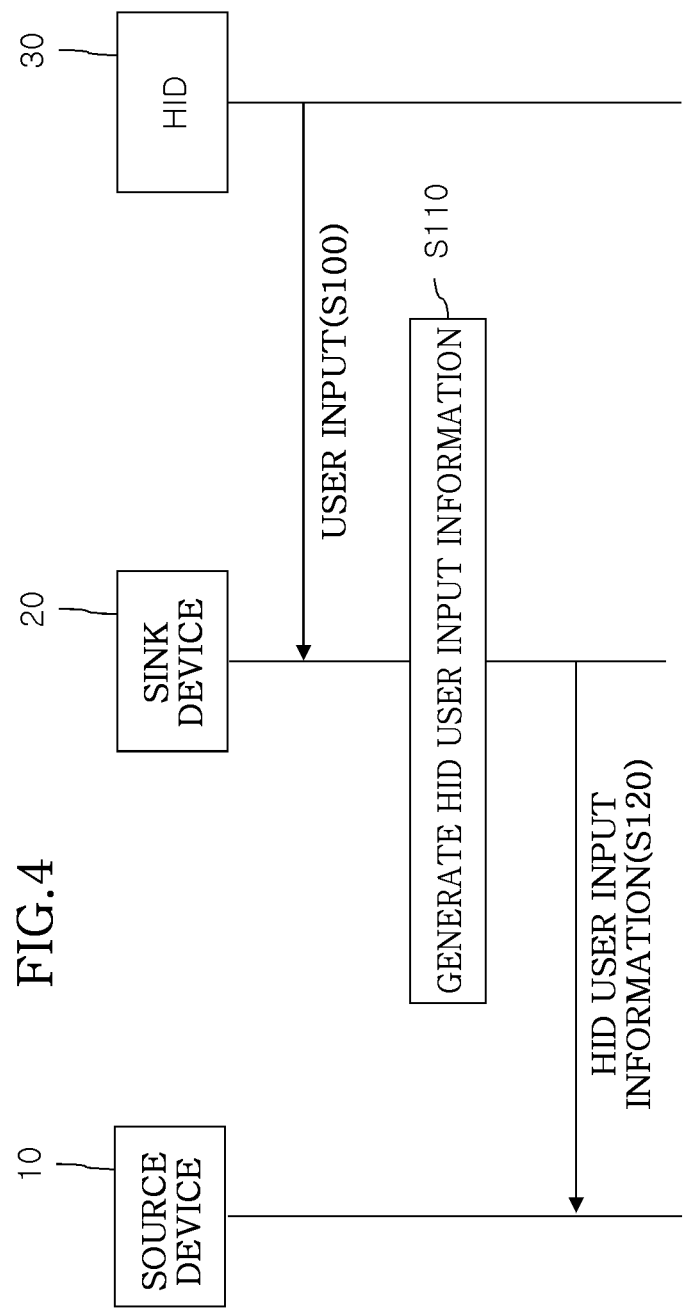
FIG. 4 is a view illustrating a user input delivering method according to an embodiment of the present invention.

FIG. 4 is a view illustrating a user input delivering method according to an embodiment of the present invention. Description of the same method as that described with reference to FIGS. 1 to 3 among user input delivering methods below will be omitted.

Referring to FIG. 4, the sink device 20 receives a user input from the HID 30 in operation S100, and generates HID user input information including the received user input in operation S110.

For example, the HID user input information may include a first field representing the type of the HID 30, a second field representing the interface type of the HID 30, and a third field including a user input received from the HID 30.

Then, the sink device 20 transmits the generated HID user input information to the source device 10 in operation S120.

Referring to FIG. 5, the HID user input information may include an HID command action frame including 'Subelement ID', 'Length', 'HID ID', 'HID interface type', 'HID device type', and 'HID value' fields.

The 'Subelement ID' field represents the type of a corresponding sub element, and the 'Length' field represents the length of the next fields in the corresponding sub element.

Also, the position of the 'Length' field is changeable, and when its position is changed in a frame, the 'Length' field represents the length of the next fields from a corresponding position.

Moreover, the 'HID ID' field, as information for identifying the HID 30, represents a globally unique identifier or a locally unique identifier for the HID 30.

The 'HID interface type' field represents the type of an interface that the HID 30 uses. As shown in FIG. 6, according to an interface type of the HID 30, the 'HID interface type' field may have a value corresponding to one of infrared, USB, Bluetooth, ZigBee, Wi-Fi, and Consumer Electronics Control (CEC).

Additionally, the 'HID device type' field represents the type of the HID 30. As shown in FIG. 7, according to an interface type of the HID 30, the 'HID device type' field may have a value corresponding to one of a keyboard, a mouse, a touch pad, a joystick, and a motion sensor.

The 'HID value' field includes a user input received from the HID 30, and as shown in FIG. 8, may include the user input in a format defined by a standard such as Bluetooth, ZigBee, or USB.

That is, the user input in the 'HID value' field may have the same format as a user input received from the HID 30.

For example, the sink device 20 may include a format received from the HID 30 in the 'HID value' field as it is, without processes for parsing a user input received from the HID 30 and converting it to another format.

In more detail, as shown in FIG. 8, a user input in the 'HID value' field may have a HID format defined by a USB standard.

In an existing USB standard, the HID 30 may deliver information between a USB device and a USB host through a data structure called a report. In the USB device, a report transmitted to a USB host is called an input report, and a report transmitted from a USB host to a USB device is called an output report.

Additionally, there is a report for setting a method of operating a USB device, and this is called a feature report. Data transmission between the HID 30 and a device driver is performed through control pipe, interrupt in pipe, and interrupt out pipe. Also, the input report of a keyboard or a mouse may be generally transmitted through interrupt input pipe.

Moreover, widely used operation information such as key input of a keyboard or button press of a mouse may be standardized and built in an HID driver. Also, the HID 30 uses a predetermined data structure called a report descriptor in order to match a specific usage to a control operation such as a specific key or button and notify it to a USB host.

That is, when the HID 30 transmits user information in a format according to the USB standard to the sink device 20, the sink 20 may include the user input in the 'HID value' field of the HID user input information by using the received format according to the USB standard as it is.

In this case, the format of the user input in the 'HID value' field may be one of the input report, the output report, the feature report, and the report descriptor, according to the existing USB standard.

The configuration of the HID user input information described with reference to FIGS. 5 to 8 is just one example, and thus, the present invention is not limited thereto. For example, some of the fields constituting the HID user input information may be omitted, or new fields may be applied to the HID user input information.

Referring to FIG. 9, the HID user input information delivered from the sink device 20 to the source device 10 may include 'HID interface type', 'HID device type', and 'HID value' fields. Since the fields are identical to those described with reference to FIGS. 5 to 8, their detailed descriptions are omitted.

Referring to FIG. 10, the 'HID interface type' field may represent 'Usage' and 'HID Interface Type'. For example, the first 2 bits of the 'HID interface type' field includes information on usage of the HID user input information and the remaining 6 bits include information on the interface type of the HID 30.

Referring to FIG. 11, the 'Usage' of the 'HID interface type' field represents whether the HID user input information delivered to the source device 10 includes data or control according to a value of the 'Usage'. That is, the 'Usage' may represent whether the HID user input information delivers data according to user input through the HID 30, or information on the user input data.

As a result, the 'Usage' represents the usage of the 'HID value' field including the user input, and the usage of the 'HID value' field may be determined according to a format of a user input received from the HID 30.

For example, when the sink device 20 receives user information according to the USB standard, the format of the user input in the 'HID value' field may be one of the input report, the output report, the feature report, and the report descriptor according to an existing USB standard. Accordingly, the 'Usage' may represent one of the formats of the user input as the usage of the 'HID value' field.

Moreover, the 'Usage', as shown in FIG. 10, may not be included in the 'HID interface type' field, and may be included in the HID user input information delivered from the sink device 20 to the source device 10, as an additional field.

Moreover, although the case in which the HID user input information is configured with an action frame and is delivered from the sink device 20 to the source device 10 is described as one example according to an embodiment of the present invention, the present invention is not limited thereto. Thus, the HID user input information may be delivered to the source device 10 according to various methods in addition to the above method.

According to an embodiment of the present invention, the sink device 20 may deliver the received HID format as it is to the source device 10 without processes such as a conversion operation on a user input received from the HID 30.

In more detail, the sink device 20 delivers the user input in an HID format to the source device 10 in addition to information on the type and interface type of the HID 30 without a parsing operation to recognize detailed content on the user input received from the HID 30, i.e., an HID command.

Therefore, the source device 10 may operate as if it were directly connected to the HID 30.

Figure 12:
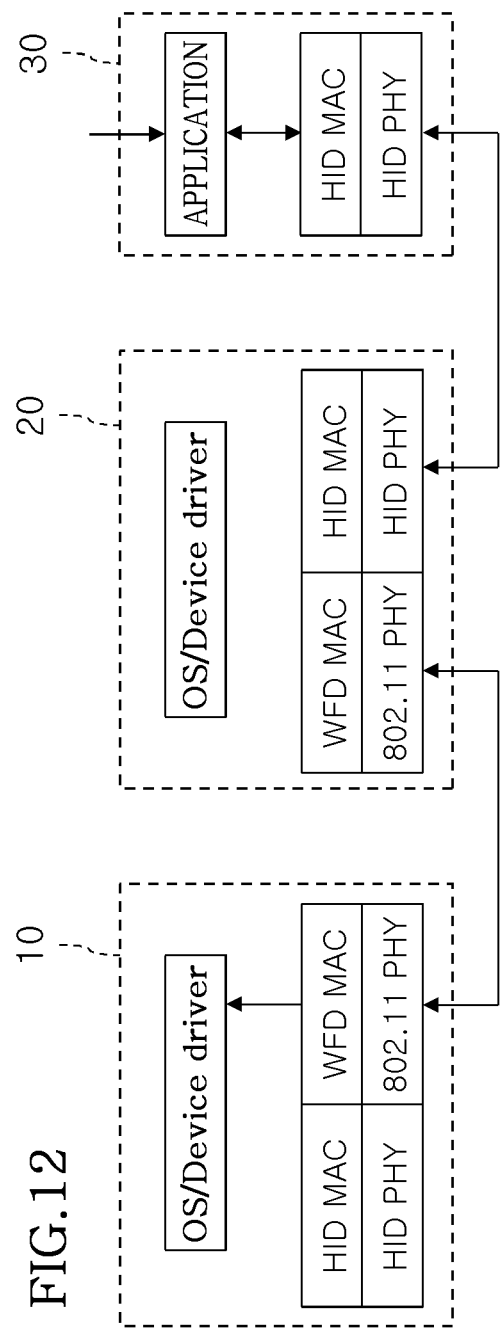
FIG. 12 is a block diagram illustrating operations for delivering a user input of a source device, a sink device, and HIDs according to a first embodiment of the present invention.

FIG. 12 is a view illustrating operations for delivering a user input of a source device, a sink device, and HIDs according to a first embodiment of the present invention.

Referring to FIG. 12, the source device 10 and the sink device 20 may include an OS/Device driver for performing each device operation, an HID MAC/PHY for processing a user input received from the HID 30, and a WFD MAC/ 802.11 PHY for processing a transmission signal according to a wireless network connection.

Moreover, the HID 30 may include an application for receiving a command from a user and an HID MAC/PHY for processing the user command according to a specific format such as a USB, Bluetooth, or ZigBee format.

The HID PHY of the sink device 20 may receive a user input in an HID format as being connected to the HID PHY of the HID 30 via an HID interface such as USB, Bluetooth, or ZigBee.

The received user input is processed through the OS/Device Driver of the sink device 20, and the OS/Device Driver includes the received HID format as it is in the HID user input information, and then transmits it to the source device 10 via the 802.11 PHY, without performing an additional conversion operation on the user input received from the HID 30.

In addition, the WFD MAC of the source device 10 obtains the user input from the HID user input information received from the sink device 20, and delivers it to the OS/Device Driver. Then, the OS/Device Driver processes the obtained user input to perform an operation corresponding thereto.

Figure 13:
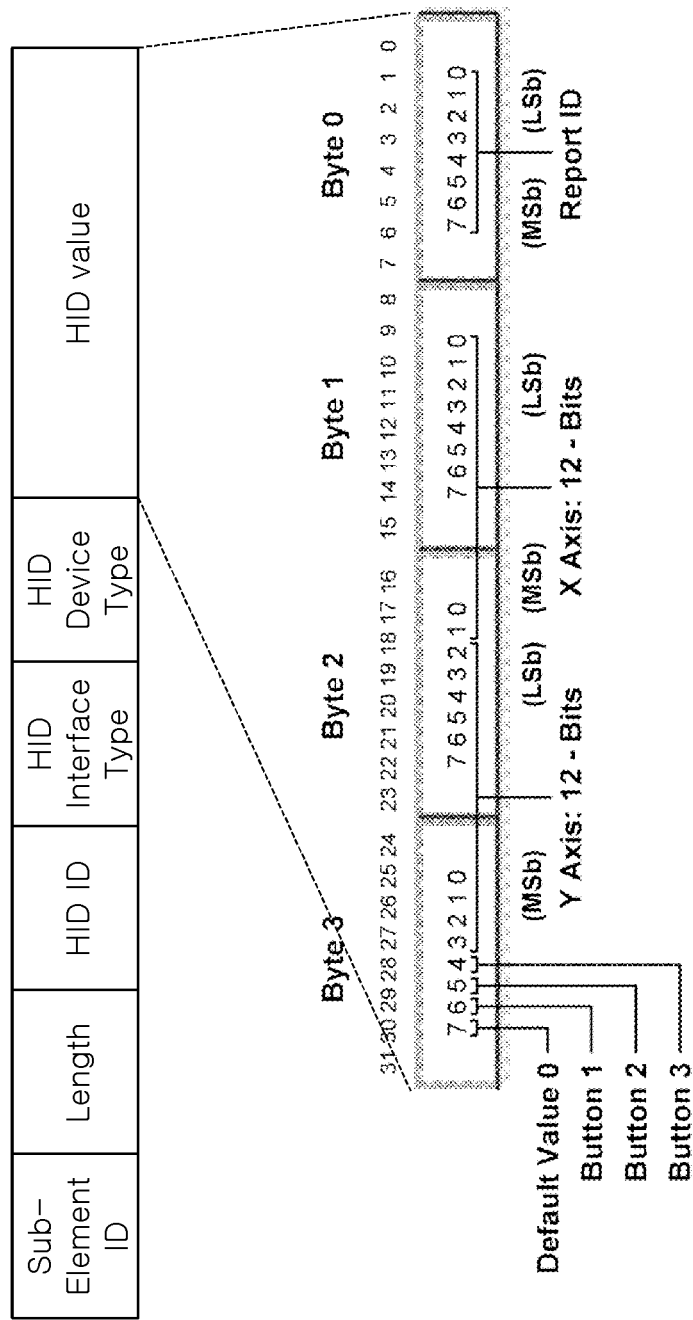
FIG. 13 is a view illustrating a format of HID user input information transmitted to a source device according to a first embodiment of the present invention.

FIG. 13 is a view illustrating a format of HID user input information transmitted to a source device. Description of the same frame as that described with reference to FIGS. 5 to 11 among frame formats below will be omitted.

Referring to FIG. 13, an action frame for delivering a user input that the sink device 20 receives from the HID 30 to the source device 10 includes the 'Subelement ID', 'Length', 'HID ID', 'HID interface type', 'HID device type', and 'HID value' fields, as mentioned above.

For example, when the HID 30 is a USB mouse, a value of the 'HID ID' field is set to '0', a value of the 'HID device type' field is set to '1', and a value of the 'HID interface type' field is set to '1'.

Moreover, the 'HID value' field includes the received HID format as it is without an additional conversion process on a user input received from the HID 30, and for example, a user input in the 'HID value' field may have a format defined by the USB standard as shown in FIG. 13.

The format of the 'HID value' field shown in FIG. 13 is a format for multibyte numeric values in reports that the HID 30 transmits in an existing standard.

According to another embodiment of the present invention, a user input received from the HID 30 is encapsulated into an IP packet via TCP/IP and delivered to the source device 10.

That is, the sink device 20 packetizes a user input received from the HID 30 by using the received HID format as it is, so as to generate an IP packet to be transmitted to the source device 10, and then, transmits the generated IP packet to the source device 10 via TCP/IP.

Figure 14:
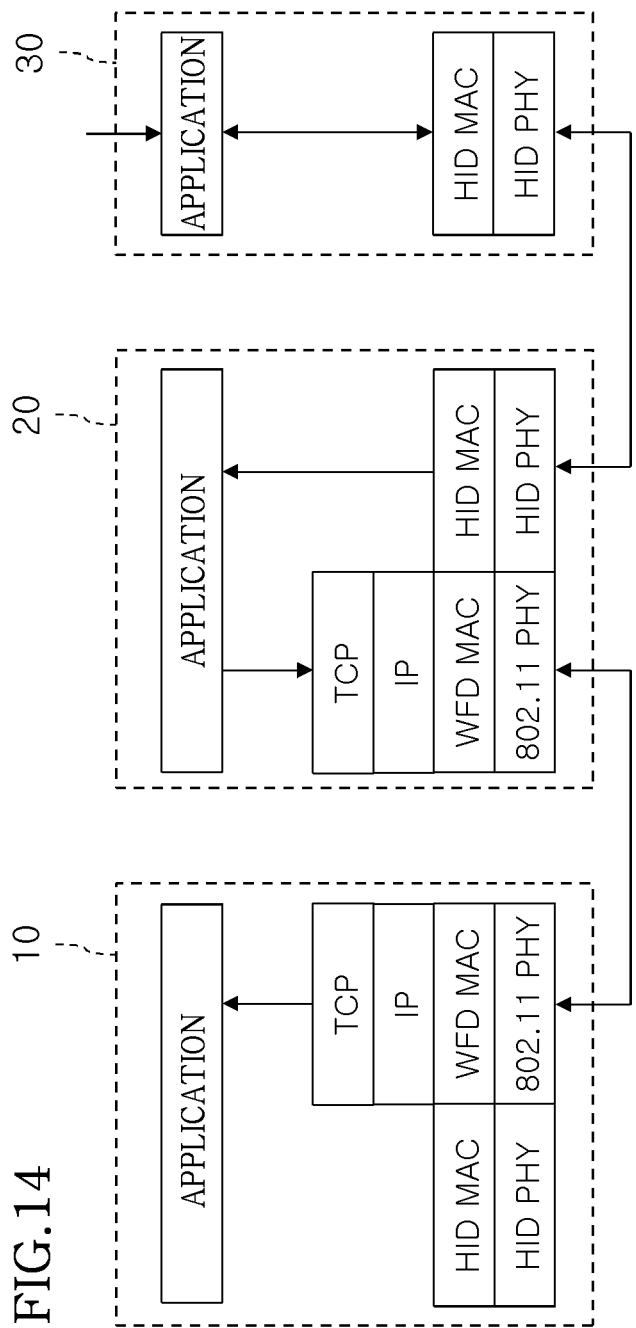
FIG. 14 is a block diagram illustrating operations for delivering a user input of a source device, a sink device, and HIDs according to a second embodiment of the present invention.
Figure 15:
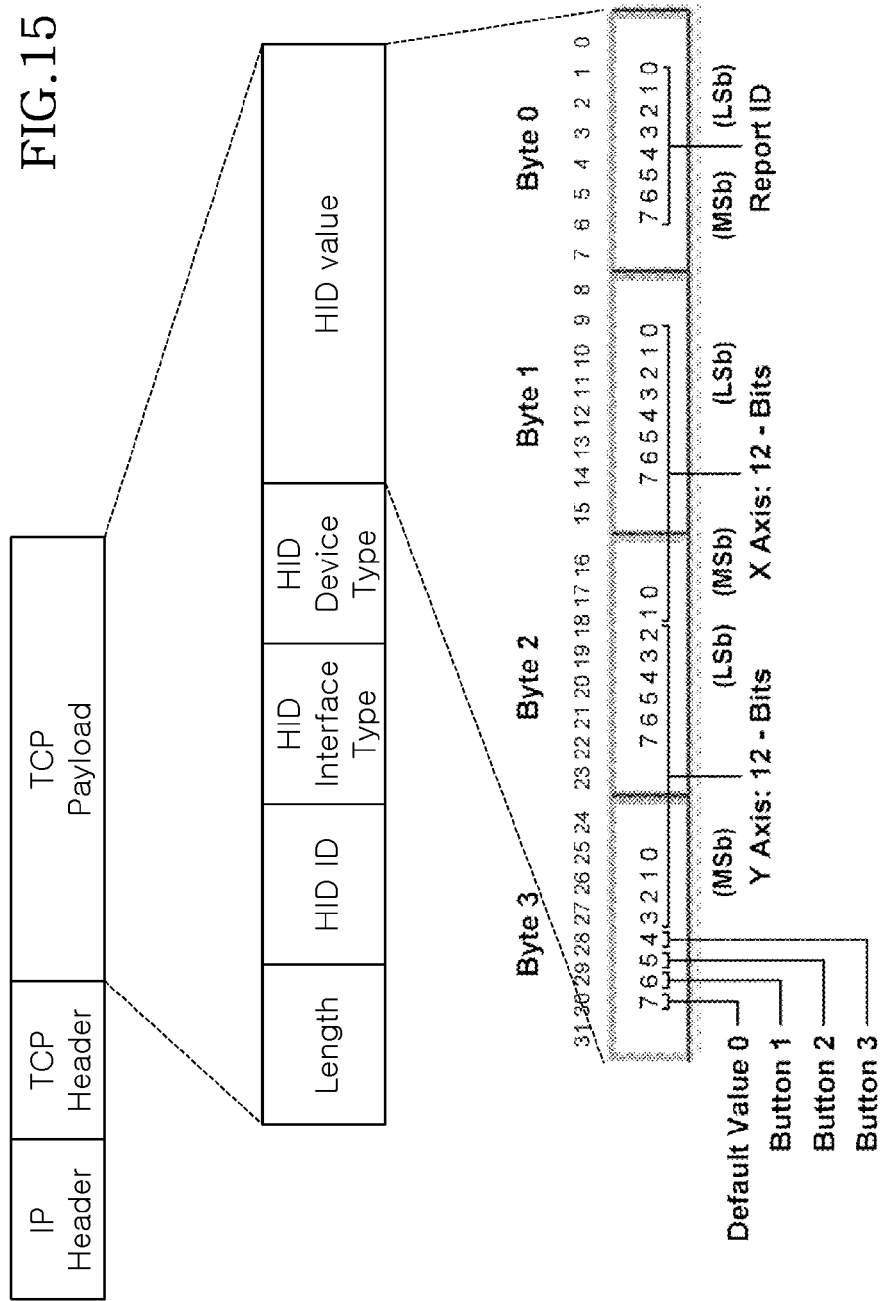
FIG. 15 is a view illustrating a format of HID user input information transmitted to a source device according to a second embodiment of the present invention.

FIG. 14 is a block diagram illustrating operations for delivering a user input of a source device, a sink device, and HIDs according to a second embodiment of the present invention. FIG. 15 is a view illustrating a format of HID user input information transmitted to the source device 10 according to a second embodiment of the present invention.

Referring to FIGS. 14 and 15, the sink device 20 receives a user input from the HID 30, and the received user input is packetized into an IP packet through a TCP/IP block and then is delivered to the source device 10 via TCP/IP.

Moreover, the IP packet delivered to the source device 10 may include IP Header, TCP Header, and TCP Payload. The HID user input information described with reference to FIGS. 5 to 11 may be included in the TCP Payload.

For example, as shown in FIG. 15, 'Length', 'HID ID', 'HID interface type', 'HID device type', and 'HID value' fields are included in the TCP Payload part in the IP packet delivered to the source device 10, and the received HID format is included as it is in the 'HID value' field without a conversion process on the user input received from the HID 30.

Furthermore, the IP packet delivered to the source device 10 is separated through a TCP/IP block, so that a user input received from the HID 30 to the sink device 20 may be obtained, and an operation corresponding to the user input may be performed by application.

Although the case in which a user input received from the HID 30 is encapsulated via TCP/IP is used as one example according to an embodiment of the present invention, the present invention is not limited thereto. For example, the user input may be encapsulated via RTSP/TCP/IP, UDP/IP, or RTP/UDP/IP.

Figure 16:
FIG. 16 is a view illustrating a format of HID user input information transmitted to a source device according to a third embodiment of the present invention.

Referring to FIG. 16, when a user input received from the HID 30 is encapsulated via RTSP/TCP/IP, the IP packet delivered to the source device 10 may include an IP Header, a TCP Header, an RTSP Header, and an RTSP Payload. The HID user input information described with reference to FIGS. 5 to 11 may be included in the RTSP Payload.

Figure 17:
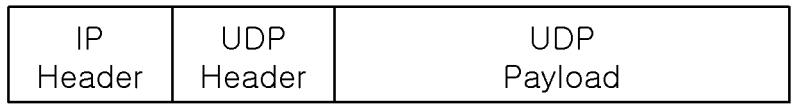
FIG. 17 is a view illustrating a format of HID user input information transmitted to a source device according to a fourth embodiment of the present invention.

Referring to FIG. 17, when a user input received from the HID 30 is encapsulated via UDP/IP, the IP packet delivered to the source device 10 may include an IP Header, a UDP Header, and a UDP Payload. The HID user input information described with reference to FIGS. 5 to 11 may be included in the UDP Payload.

Figure 18:
FIG. 18 is a view illustrating a format of HID user input information transmitted to a source device according to a fifth embodiment of the present invention.

Additionally, referring to FIG. 18, when a user input received from the HID 30 is encapsulated via RTP/UDP/IP, the IP packet delivered to the source device 10 may include an IP Header, a UDP Header, an RTP Header, and a RTP Payload. The HID user input information described with reference to FIGS. 5 to 11 may be included in the RTP Payload.

Moreover, in relation to the IP packet described with reference to FIGS. 15 to 18, a format of HID user input information in the payload part (that is, TCP Payload, RTSP Payload, UDP Payload or RTP Payload) may be changed.

Figure 19:
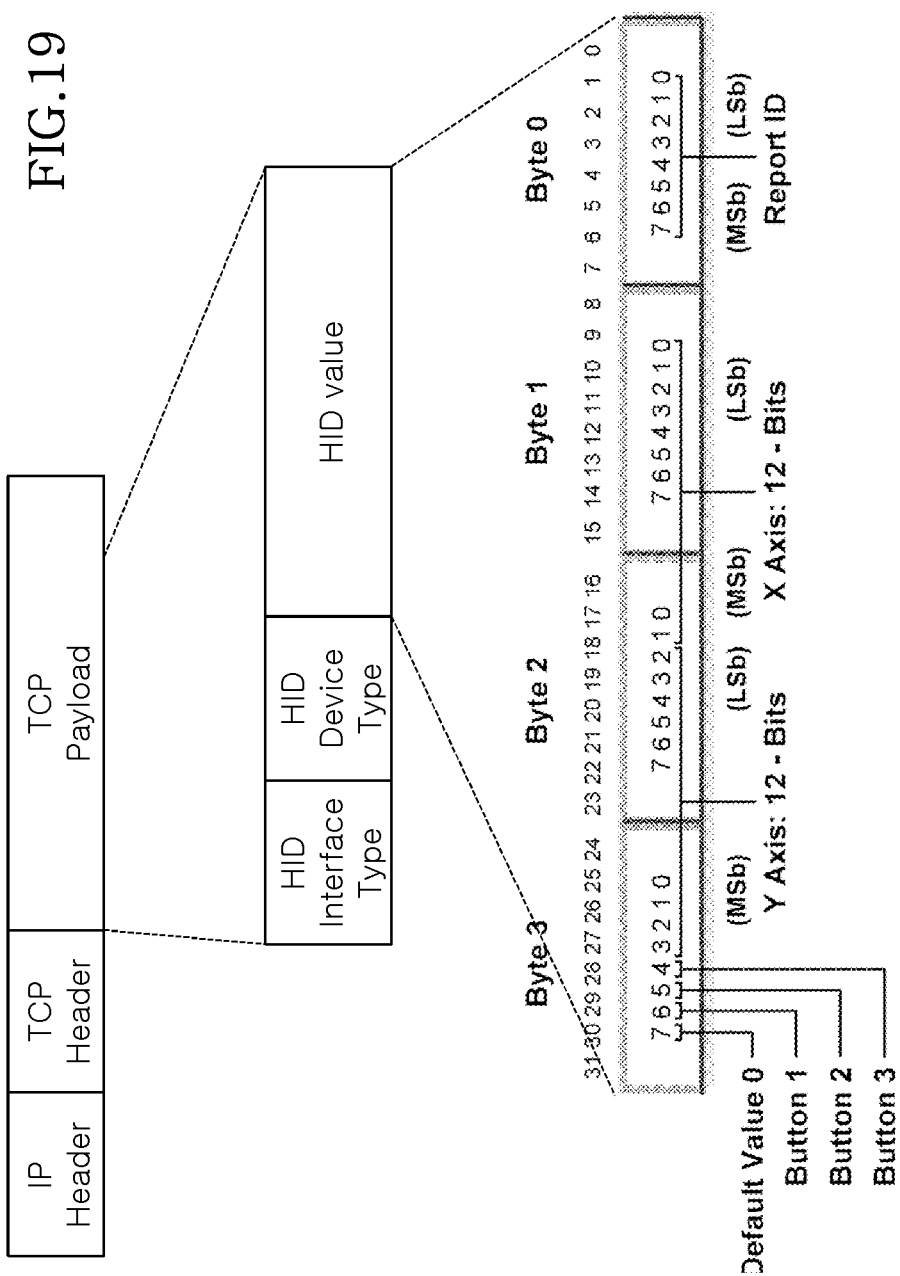
FIG. 19 is a view illustrating a format of HID user input information transmitted to a source device according to a sixth embodiment of the present invention.

For example, as shown in FIG. 19, HID user input information in a TCP Payload part in an IP packet delivered to the source device 10 may include the 'HID interface type', 'HID device type', and 'HID value' fields described with reference to FIGS. 9 to 11, and also may further include information on the 'Usage' of corresponding HID user input information.

Figure 20:
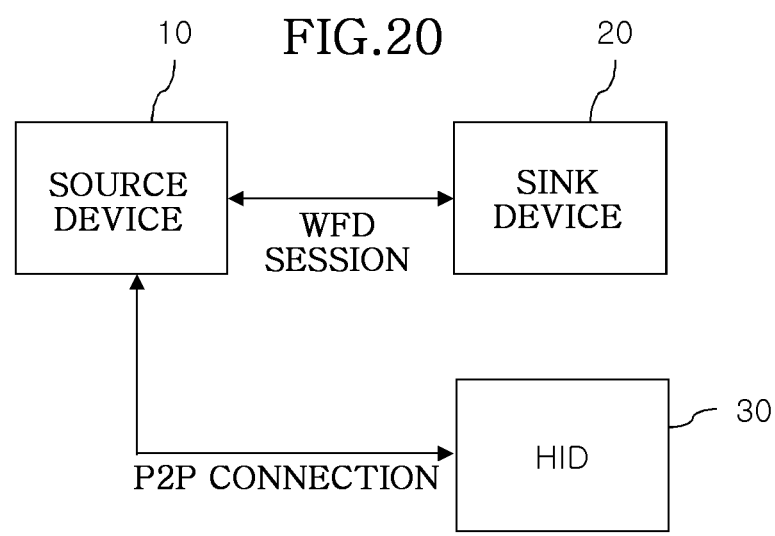
FIG. 20 is a block diagram illustrating operations for delivering a user input of a source device, a sink device, and HIDs according to a third embodiment of the present invention.

FIG. 20 is a block diagram illustrating operations for delivering a user input of a source device, a sink device, and HIDs according to a third embodiment of the present invention. Description of the same configuration as that described with reference to FIGS. 1 to 19 among configurations of the devices of FIG. 20 below will be omitted.

Referring to FIG. 20, a new P2P channel for delivering the user input may be allocated between the HID 30 and the source device 10.

For example, the HID 30 is connected to a client of the source device 10, i.e., a Group Owner (GO) of a P2P group, to configure a P2P channel for transmitting the user input during P2P connection.

Or, session pairing occurs in a P2P group via a session between the source device 10 and the sink device 20, and the HID 30 joins the P2P group as a client to transmit a user input to a P2P data frame.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of delivering a user input received from a Human Interface Device (HID) to a source device by a sink device, the method comprising:
   receiving, by the sink device, the user input from the HID, wherein the user input is generated by the HID;
   generating, by the sink device, HID user input information including a first field that represents a type of the HID, a second field that represents an interface type of the HID, and a third field that includes the user input received from the HID; and
   transmitting, by the sink device, the generated HID user input information to the source device,
   wherein the user input generated by the HID is delivered to the source device through a user input back channel which is established between the sink device and the source device, and
   wherein the sink device receives multimedia contents from the source device, and the sink device renders the received multimedia contents.

2. The method according to claim 1, wherein the first field has a value corresponding to one of a keyboard, a mouse, a touch device, a joystick, and a motion device according to the type of the HID.

3. The method according to claim 1, wherein the second field has a value corresponding one of infrared, USB, Bluetooth, ZigBee, and Wi-Fi according to the interface type of the HID.

4. The method according to claim 1, wherein the third field comprises the user input in the same format as the user input received from the HID.

5. The method according to claim 4, wherein the user input in the third field has an HID format defined by a USB standard.

6. The method according to claim 1, wherein the generated HID user input information further comprises information on a usage of the HID user input information.

7. The method according to claim 6, wherein the information on the usage represents whether the HID user input information comprises data or control information.

8. The method according to claim 1, wherein the generated HID user input information is delivered to the source device via TCP/IP.

9. A sink device delivering a user input received from a Human Interface Device (HID) to a source device, the sink device comprising:
   a user interface unit that receives the user input from the HID, wherein the user input is generated by the HID;
   a control unit that generates HID user input information including a first field that represents a type of the HID, a second field that represents an interface type of the HID, and a third field that includes the user input received from the HID; and
   a wireless transmitting/receiving unit that transmits the generated HID user input information to the source device, and
   wherein the user input generated by the HID is delivered to the source device through a user input back channel which is established between the sink device and the source device, and
   wherein the sink device receives multimedia contents from the source device, and the sink device renders the received multimedia contents.

10. The device according to claim 9, wherein the first field has a value corresponding to one of a keyboard, a mouse, a touch device, a joystick, and a motion device according to the type of the HID.

11. The device according to claim 9, wherein the second field has a value corresponding one of infrared, USB, Bluetooth, ZigBee, and Wi-Fi according to the interface type of the HID.

12. The device according to claim 9, wherein the third field comprises the user input in the same format as the user input received from the HID.

13. The device according to claim 9, wherein the generated HID user input information further comprises information on a usage of the HID user input information.

14. The device according to claim 9, wherein the wireless transmitting/receiving unit packetizes the generated HID user input information and transmits the packetized generated HID user input information to the source device via TCP/IP.

\* \* \* \* \*